United States Patent
Patil et al.

(10) Patent No.: US 10,324,987 B2
(45) Date of Patent: Jun. 18, 2019

(54) APPLICATION SEARCH USING DEVICE CAPABILITIES

(71) Applicant: Samsung Electronics Co., Ltd., Suwon-si, Gyeonggi-do (KR)

(72) Inventors: Sameer Patil, Santa Ana, CA (US); Eric Glover, Palo Alto, CA (US); James Delli Santi, San Jose, CA (US); Taher Saviwala, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 14/318,530

(22) Filed: Jun. 27, 2014

(65) Prior Publication Data
US 2015/0186533 A1 Jul. 2, 2015

Related U.S. Application Data

(60) Provisional application No. 61/922,626, filed on Dec. 31, 2013.

(51) Int. Cl.
*G06Q 30/06* (2012.01)
*G06F 16/9535* (2019.01)

(52) U.S. Cl.
CPC ..... *G06F 16/9535* (2019.01); *G06Q 30/0631* (2013.01)

(58) Field of Classification Search
CPC .......... G06F 17/30864; G06C 30/0256; H04L 67/16; H04L 67/306; H04L 69/329;
(Continued)

(56) References Cited

U.S. PATENT DOCUMENTS 8,639,733 B2 * 1/2014 Holden ................. G06F 13/385
707/827
8,788,944 B1 * 7/2014 Gill .......................... G06F 8/61
715/744
(Continued)

FOREIGN PATENT DOCUMENTS

| CN | 102368239 A | 3/2012 |
| CN | 102761595 A | 10/2012 |
| CN | 103414766 A | 11/2013 |

OTHER PUBLICATIONS

PCT International Search Report, PCT Application No. PCT/US14/72891, dated Mar. 26, 2015, 20 pages.
(Continued)

*Primary Examiner* — Robert W Beausoliel, Jr.
*Assistant Examiner* — Nirav K Khakhar
(74) *Attorney, Agent, or Firm* — Jefferson IP Law, LLP

(57) ABSTRACT

An application search system stores information describing device capabilities used by one or more applications. The device capabilities describe interfaces with hardware on the user device. The application search system identifies the application capabilities related to applications in any search results. One method that the application search system identifies application capabilities includes identifying function calls to device interfaces used by an application. The application search system may receive user-selected identification of a desired application capability from a search, from a user-selected entry or from a search term, among others. The application capability in a search may be used to score relevance of applications and increase relevance of applications matching the desired application capability. The application capability may also be used after a search is
(Continued)

executed to display application capabilities to a user and permit a user to select desired application capabilities related to the search results.

28 Claims, 11 Drawing Sheets

(58) Field of Classification Search
CPC ........... G06Q 30/0256; G06Q 30/06–30/0601; G06Q 30/0631
See application file for complete search history.

(56) References Cited

U.S. PATENT DOCUMENTS

| | | | |
|---|---|---|---|
| 9,424,018 B2* | 8/2016 | Wong | G06Q 30/0603 |
| 2002/0016786 A1* | 2/2002 | Pitkow | G06F 17/30884 |
| 2003/0191775 A1 | 10/2003 | Vaughan et al. | |
| 2005/0198070 A1* | 9/2005 | Lowry | G06F 17/30619 |
| 2006/0026147 A1 | 2/2006 | Cone et al. | |
| 2009/0055334 A1 | 2/2009 | Song et al. | |
| 2009/0171940 A1* | 7/2009 | Boller | G06F 17/30389 |
| 2010/0153335 A1* | 6/2010 | Esteve Balducci | G06Q 10/107 707/610 |
| 2010/0233996 A1* | 9/2010 | Herz | H04L 63/08 455/411 |
| 2011/0289078 A1* | 11/2011 | Woodard | G06F 17/30884 707/723 |
| 2012/0110174 A1 | 5/2012 | Wootton et al. | |
| 2012/0233205 A1* | 9/2012 | McDermott | G06F 17/30011 707/769 |
| 2012/0246291 A1 | 9/2012 | Wong et al. | |
| 2012/0284247 A1* | 11/2012 | Jiang | G06F 17/30867 707/706 |
| 2012/0303476 A1* | 11/2012 | Krzyzanowski | G06F 8/60 705/26.5 |
| 2012/0316955 A1 | 12/2012 | Panguluri et al. | |
| 2013/0166678 A1* | 6/2013 | Barak | H04L 67/303 709/217 |
| 2013/0173604 A1* | 7/2013 | Li | G06F 17/30687 707/723 |
| 2013/0304608 A1 | 11/2013 | Mehta et al. | |
| 2014/0006440 A1* | 1/2014 | Forte | G06F 17/30867 707/769 |

OTHER PUBLICATIONS

Supplementary European Search Report for EP Application No. 14876956, dated May 17, 2017, 9 pages.
Chinese Office Action dated Feb. 2, 2019, issued in Chinese Patent Application No. 20140076743.5.

* cited by examiner

APPLICATION SEARCH USING DEVICE CAPABILITIES

CROSS-REFERENCE TO RELATED APPLICATION

This application claims the benefit of U.S. Provisional Application No. 61/922,626 filed Dec. 31, 2013, which is hereby incorporated by reference in its entirety.

BACKGROUND

Field of Art

The disclosure generally relates to application search, and more particularly to searching for applications based on the sensors used by an application.

Description of the Related Art

In recent years, use of computers, smartphones, and other Internet-connected devices has grown exponentially. Correspondingly, the number of available applications for such devices has also grown. Today, many diverse applications can be accessed on any number of different devices, including, but not limited to, smartphones, personal computers, refrigerators, automobiles, and televisions. These diverse applications can range from business driven applications, games, educational applications, news applications, shopping applications, efficiency applications, messaging applications, video chatting applications, media streaming applications, social networking applications, and so much more.

User devices also vary in capabilities available to applications on the device. These capabilities include various sensors and interfaces to physical components on a device. For example, user devices may include capabilities such as access to various types of physical components and physical sensors to provide a location of the device, a camera, a touch screen, a keyboard, microphone, and other functionality. Furthermore, application developers create a variety of applications that use different sensors. It is difficult for users to determine applications that use particular sensors, or be aware that a certain application uses a particular sensor.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
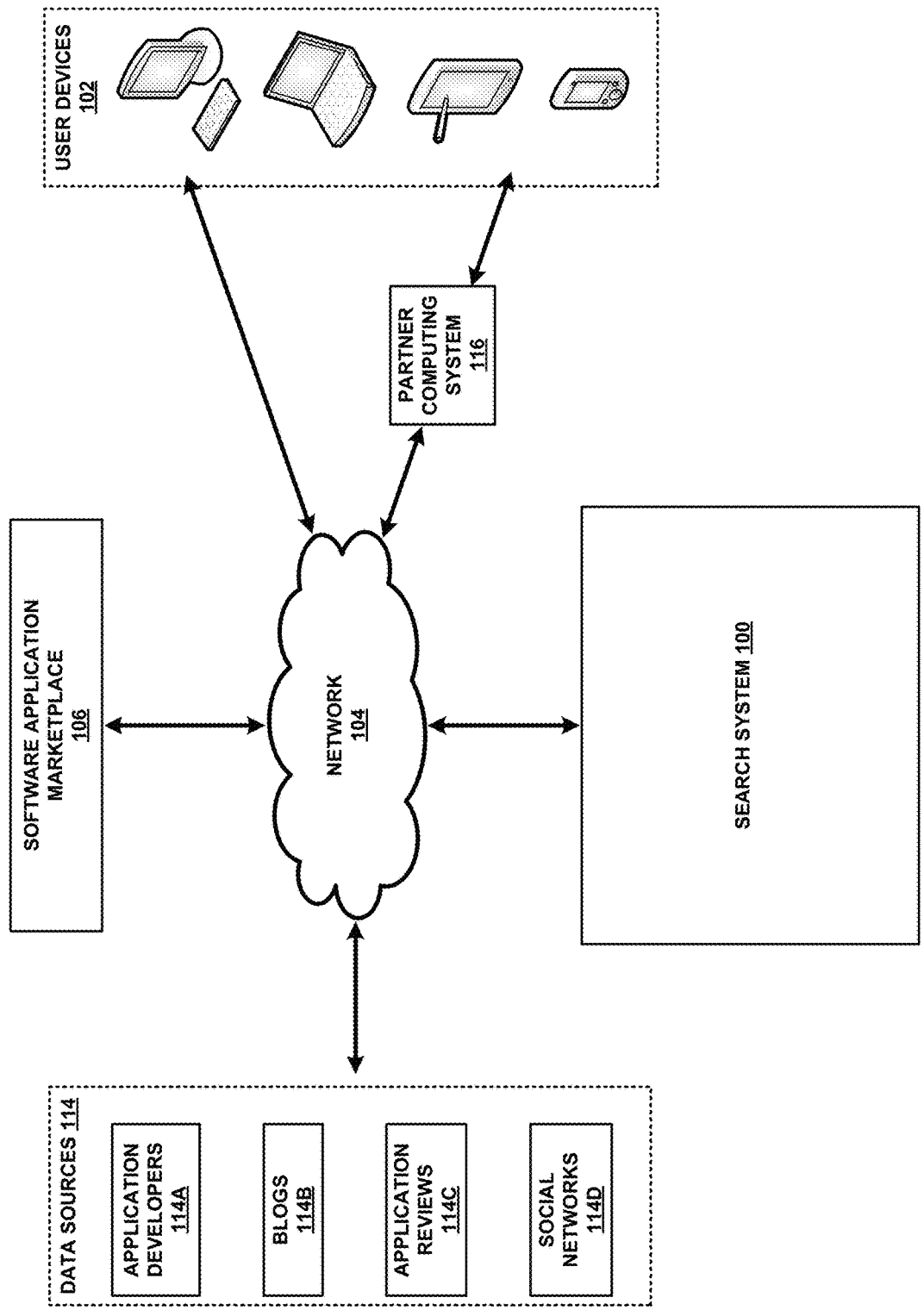
FIG. 1 is a functional block diagram illustrating an example environment including a search system configured to perform searches for software applications.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that, wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A search system receives a search query from a user's computing device (e.g., a mobile computing device). The search system generates search results in response to the received search query. The search results may include a list of applications and result scores associated with the applications. The result scores may be used to rank the applications in the list. For example, a larger result score associated with an application may indicate that the application is more relevant to the received search query. The search system may transmit the search results to the user's computing device so that the user may select one of the applications to preview and/or download.

The search system includes an application data store that the search system may use to generate the search results. The application data store includes data associated with a plurality of different applications. The data associated with an application is referred to herein as an "application record" (e.g., an application record 270 of FIG. 3). The application data store includes a plurality of different application records that each includes data related to a different application. In some implementations, the application data store may not store the applications (e.g., the executable programs) described by the application records. Instead, the applications may be accessed on one or more application marketplaces that are configured to distribute the applications.

An application record may include a variety of different types of data related to an application. In some implementations, an application record may include the name of the application, the developer of the application, a description of the application, and a category of the application, along with other data described herein. An application record also includes a set of application capabilities of the application. The application capabilities designate interfaces and hardware capabilities of a device that may be used by the application. Such application capabilities include sensors and other hardware inputs to a user device, in addition to transmission and other hardware outputs of the user device. For example, such capabilities include using a location service on a device, using gyroscopic sensors, interfacing with a device via Bluetooth, receiving input from a fingerprint scanner, using sensors to read temperature, humidity, or altitude, or heart rate. Additional capabilities include FM receivers, IR transmitters or receivers, RFID or NFC communication interfaces, embedded cryptographic capabilities among others. Application capabilities may also describe performance capabilities of a device, including whether an application performs well (e.g., executes slowly), and also include software platform capabilities, such as the operating system and software environment of a device.

An application's capabilities are determined by the application search system using various means. The application's capabilities may be designated by the publisher of the application, or by an application marketplace distributing the application. The application search system may also use information from various third party data sources, such as reviews, blogs, social networks, and so forth to identify terms associated with the application that indicate use of particular capabilities. For example, poor reviews describing performance of an application on a particular processor or memory configuration may indicate performance capabilities that are undesirable for that application.

An application's capabilities may also be determined from behavior of the application. The application is analyzed, for example, to determine permissions requested by the application to use various device capabilities. In addition, the application may be observed when executed, to determine what capabilities are used by the application. The application executable may also be analyzed to identify recognizable function calls to particular capabilities, directly or through a programming interface associated with the capability. For example, an application may be identified as outputting audio to a Bluetooth device if that application uses a function call to an application programming interface (API) associated with a Bluetooth library. Using these methods, alone or in any combination, the application's capabilities are associated with the application record.

The application capabilities are used in various embodiments to assist users to search for and identify applications using particular capabilities. In general, an application search is performed in several steps, each of which may incorporate device capabilities into the search. Initially, a user device provides a search query to the application search system. The search query may be analyzed to determine whether the search query includes terms designating a device capability. For example, a search query of "tilt control maze game" is analyzed to identify the term "tilt," which is associated with gyroscopic control, in which case the application search may weigh applications with application capabilities including gyroscopic control as more relevant to the search.

In addition, the search query may include metadata about the user device requesting the query. The capabilities of a user device are termed device capabilities. The metadata of the search query may be analyzed to identify particular device capabilities of the user device. The metadata may specifically identify device capabilities, or the metadata may specify a device model or configuration, in which case device capabilities may be identified using information about the identified model or configuration. A user may also select from a menu of device capabilities to search for, which may be limited to device capabilities available on the user device.

An application search is executed using the search query. The device capabilities identified relating to the search query (either as a search term (reflecting user intent) or identified device capabilities) may be used as relevance factors in the search for application to score the relevance of the resulting applications, or may be used as a filter, for example to exclude applications which do not correspond to device capabilities selected by the user.

After a set of applications is selected responsive to the search request, the selected applications may be analyzed to identify application capabilities used by the selected applications. These application capabilities are provided to the user device for display along with the search results. In addition, the application capabilities of the search results may be displayed with selectable filters to enable the user to select desirable application capabilities of the results. The identification and display of application capabilities may be performed separately or in addition to the search incorporating application capabilities.

For example, the user may enter a search query of "maze game." When the application search system performs a search for "maze game" the application search system identifies a set of application capabilities of the search results to be used in filtering. For example, it may select the three most common application capabilities of the search results, or the three least common application capabilities. In this example, the identified application capabilities include interactions with a gyroscope on the user device. When displayed to the user as a filter, the user may use the filter to identify result applications that use the gyroscope, permitting the user to quickly find applications that have a feature in common.

The application capabilities may also be used by the user to identify and exclude unwanted device capabilities. For example, the user may perform a search for a game, and the application capabilities shown to the user may reveal that certain applications unexpectedly use location capabilities. The user may be wary of a free game that uses location capabilities and chose to filter out the applications that use location capabilities.

These various features may be used separately and together to provide application capability search and identification to a user. Various further features of disclosed embodiments are described further below.

System Architecture

FIG. 1 is a functional block diagram illustrating an example environment including a search system 100 configured to perform searches for software applications. A software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, special purpose external device integration applications, and games.

Applications can be executed on a variety of different computing devices ("user devices"). For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the computing device. In other examples, the user may download and install applications on the computing device or the user may use an application in a virtual environment that interact with capabilities on the computing device or simulate capabilities of a computing device.

The various computing devices provide various device capabilities for use by applications executing on the computing devices. A device capability is provided by an interface on the computing device for interaction with a hardware element of the user device that provides an input or output of the computing device. Example device capabilities include interacting with a touch screen, location services (e.g., global positioning satellite (GPS) services), Bluetooth interface and related devices, microphone, and camera, among others. Device capabilities include devices that are not permanently connected through another communication channel on the user device. For example, device capability would include, a Bluetooth speaker connected to a Bluetooth wireless transceiver, a printer connected to a universal serial bus (USB) port, or a magnetic stripe reader installed in a microphone jack. Device capabilities include physical sensors, which receive information about the environment of the user device. Such sensors include accelerometers, microphones, location services, compass, near-field communication (NFC) and so forth. Thus, the device capabilities generally characterize ways in which a user may interact with (provide inputs to) or receive information from the application. While many applications may provide information on a display of a user device, fewer applications may use an uncommon device capability, such as pairing to a particular Bluetooth device (e.g., paired to a heart rate monitor or fitness tracker). Device capabilities may also be added or removed to a user device over time, for example if a user pairs to another Bluetooth device.

In addition to hardware input and output capabilities described above, device capabilities also include performance capabilities, describing its processing performance, available memory, and any other aspects of the device's ability to effectively execute the application. The performance capabilities may be described by the specific make and model of components on a device, or may be described by numerical evaluations of the processing hardware. Device capabilities may also include a software platform of the device, such as its operating system and software packages available to the application.

The device capabilities, in addition to generally specifying a capability (e.g., a touchscreen), may also include parameters about the device capability. For example, touchscreens may be able to recognize a user's touch at various numbers of points on the screen. This may vary between different touch screens, as some only permit one touch point, while others recognize two, three, or more. In this example, one parameter for a touchscreen device capability is the number of simultaneous touches the touchscreen can identify. Various other parameters may be identified for capabilities according to the used for devices, according to distinguishing features of the capabilities. For example, a display may also indicate its resolution, refresh rate, and its display technology, such as whether it is an LED, LCD, or e-paper. Thus, such parameters may include touchscreens capable of identifying multiple gestures, devices with multiple cameras, and so forth.

Applications may use all, some, or none of the device capabilities available on a device. The device capabilities used by an application are termed application capabilities. As example application capabilities, a mapping and transit application may use device capabilities for determining location and device capabilities for determining directional orientation (e.g., a compass). A music application may use a device capability to play on a Bluetooth-connected speaker, while a fitness tracker may use a device capability to determine heart rate. The application may provide further functionality that uses or does not use the device capabilities on a device.

The functionality of an application may be accessed on the computing device on which the application is installed. Additionally, or alternatively, the functionality of an application may be accessed via a remote computing device. In some examples, all of an application's functionality may be included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites.

The search system 100 is configured to receive search queries from one or more user device(s) 102 via a network 104. The search system 100 performs a search for applications in response to a received search query. The search system 100 may generate a set of search results that includes a list of applications, each of which is associated with a result score that indicates the rank of the application relative to the other applications in the list. A list may comprise any listing, set, or grouping of applications, which may be ordered or ranked, and may include various data relating to the applications, such as the name, publisher, and other aspects of the application, and so forth. The result list might not include the application executable code, but may instead include a reference to a location where the executable code can be obtained. The search system 100 may then transmit the search results to the user device 102 that transmitted the search query.

A user device 102 may display the search results to the user and allow the user to select one of the applications in the list in order to view information related to the application and/or download the application. The applications (e.g., the executable programs) listed in the search results sent to the user device 102 may be accessible from (e.g., downloaded from) systems different than the search system 100 in some examples. Put another way, the search system 100 may store data related to applications that are accessible in locations other than the search system 100. For example, the applications may be accessible from a software application marketplace 106 (hereinafter "application marketplace 106"). The application marketplace 106 may be a digital distribution platform configured to distribute the applications. Example application marketplaces include, but are not limited to, Google Play developed by Google Inc., the App Store developed by Apple Inc., and Windows Phone Store developed by Microsoft Corporation. Although a single application marketplace 106 is illustrated in FIG. 1, the techniques of the present disclosure may be applicable to environments including multiple application marketplaces. Although the applications listed in the search results generated by the search system 100 may be accessed in locations other than the search system 100, in some implementations the search system 100 includes applications for download.

The search system 100 includes various modules as described below for retrieving and indexing information relating to applications, identifying capabilities of a device used by an application ("application capabilities"), and providing applications in response to a search query. The operation of various components in the search system 100 is described in further detail with respect to FIG. 3. In one embodiment, the application search system determines application capabilities of an application. The application capabilities are device capabilities used by a particular application. The application capabilities retrieved and stored by the search system 100 are described in further detail below.

The search system 100 may communicate with the user devices 102, a partner computing system 116, the application marketplace 106, and the data sources 114 via the network 104. Examples of the user devices 102, the partner computing system 116, the data sources 114, the application marketplace 106, and the network 104 are now described in turn.

The example environment illustrated in FIG. 1 includes a plurality of user devices 102. An individual user device may also be referred to herein as a user device 102. User devices 102 can be any computing devices that are capable of providing search queries to the search system 100. User devices 102 may include, but are not limited to, smart phones, tablet computers, laptop computers, and desktop computers, as illustrated in FIG. 1. User devices 102 may also include other computing devices having other form factors, such as computing devices included in vehicles, gaming devices, televisions, or other appliances (e.g., networked home automation devices).

The user devices 102 may use a variety of different operating systems. In an example where a user device 102 is a mobile device, the user device 102 may run an operating system including, but not limited to, ANDROID, iOS developed by Apple Inc., or WINDOWS PHONE developed by Microsoft Corporation. In an example where a user device 102 is a laptop or desktop device, the user device 102 may run an operating system including, but not limited to, MICROSOFT WINDOWS, MAC OS, or Linux (e.g., RED HAT LINUX). User devices 102 may also access the search system 100 while running operating systems other than those operating systems described above, whether presently available or developed in the future.

User devices 102 can communicate with the search system 100 via the network 104. In some examples, a user device 102 may communicate with the search system 100 using an application installed on the user device 102. In general, a user device 102 may communicate with the search system 100 using any application that can transmit search queries to the search system 100. In some examples, a user device 102 may run an application that is dedicated to interfacing with the search system 100, such as an application dedicated to application searches. In some examples, a user device 102 may communicate with the search system 100 using a more general application, such as a web-browser application. The application run by a user device 102 to communicate with the search system 100 may display a search field on a graphical user interface (GUI) in which the user may enter search queries. The user may enter a search query using a touch screen or physical keyboard, a speech-to-text program, or another form of user input.

A search query entered into a GUI on a user device 102 may include words, numbers, and/or symbols. In general, a search query may be a request for information retrieval (e.g., search results) from the search system 100. For example, a search query may be directed to retrieving a list of applications in examples where the search system 100 is configured to generate a list of applications as search results. A search query directed to retrieving a list of applications may indicate a user's desire to retrieve applications that have a functionality described by the search query.

A user device 102 may receive a set of search results from the search system 100 that are responsive to the search query transmitted to the search system 100. The user device 102 may be running an application including a GUI that displays the search results received from the search system 100. For example, the application used to transmit the search query to the search system 100 may also display the received search results to the user. As described above, the application that displays the received search results to the user may be dedicated to interfacing with the search system 100 in some examples. In other examples, the application may be a more general application, such as a web-browser application.

The GUI of the application running on the user device 102 may display the search results to the user in a variety of different ways, depending on what information is transmitted to the user device 102. In examples where the search results include a list of ranked applications, the search system 100 may transmit the list of applications to the user device 102. In this example, the GUI may display the search results to the user as a list of application names. In some examples, the search system 100, or other computing system, may transmit additional information to the user device 102 including, but not limited to, application ratings, application download numbers, application screenshots, and application descriptions. This additional information may be stored in the application data store 108 and transmitted by the search system 100 to the user device 102 in some examples. In examples where the user device 102 receives this additional information, the GUI may display this information along with the list of application names. In some examples, the GUI displays the search results as a list of applications ordered from the top of the screen to the bottom of the screen by descending result score. In some examples, the search results are displayed under the search field in which the user entered the search query. In some examples, the user device 102 may request or receive search results without express user input.

In some examples, user devices 102 may communicate with the search system 100 via the partner computing system 116. The partner computing system 116 may represent a computing system of a third party that may leverage the search functionality of the search system 100. The partner computing system 116 may belong to a company or organization other than that which operates the search system 100. Example third parties that may leverage the functionality of the search system 100 may include, but are not limited to, Internet search providers, hardware and device manufacturers, and wireless communications service providers and e-commerce providers. The user devices 102 may send search queries to the search system 100 via the partner computing system 116. The user devices 102 may also receive search results from the search system 100 via the partner computing system 116. The partner computing system 116 may provide a user interface to the user devices 102 in some examples and/or modify the search experience provided on the user devices 102.

FIG. 1 shows a plurality of data sources 114A, 114B, 114C, 114D (collectively "data sources 114"). The data sources 114 are sources of data that the search system 100 uses to generate and update data relating to applications. For example, the search system 100 may generate new application records (e.g., application record 270 of FIG. 3) and update existing application records based on data retrieved from the data sources 114.

The data sources 114 may include a variety of different data providers. The data sources 114 may include data from application developers 114A, such as application developers' websites. The data sources 114 may also include other websites, such as websites that include web logs 114B (i.e., blogs), application review websites 114C, or other websites including data related to applications. Additionally, the data sources 114 may include social networking sites 114C, such as Facebook (e.g., Facebook posts) and Twitter (e.g., text from tweets). Data sources 114 may also include additional types of data sources in addition to data sources 114A, 114B, 114C, 114D described above. For example, data sources may include other commercial entities that describe applications or information accessible within other applications. Different data sources may have their own content and update rate.

FIG. 1 shows an application marketplace 106. The application marketplace 106 may be another source of data that the search system 100 uses to generate and update the application data store 108. For example, the search system 100 may generate new application records and update existing application records based on data retrieved from the application marketplace 106. Although only one application marketplace 106 is illustrated in FIG. 1, the search system 100 may generate new application records and update existing application records based on data retrieved from multiple application marketplaces. Different application marketplaces may have their own content and update rate.

As described above, the user devices 102, the search system 100, the application marketplace 106, and the data sources 114 may be in communication with one another via the network 104. The network 104 may include various types of networks, such as a wide area network (WAN) and/or the Internet. Although the network 104 may represent a long range network (e.g., Internet or WAN), in some implementations, the network 104 may include a shorter range network, such as a local area network (LAN). The network 104 is any suitable system for communications between these various systems, and may use any standard or non-standard communication technologies and/or protocols.

Figure 2:
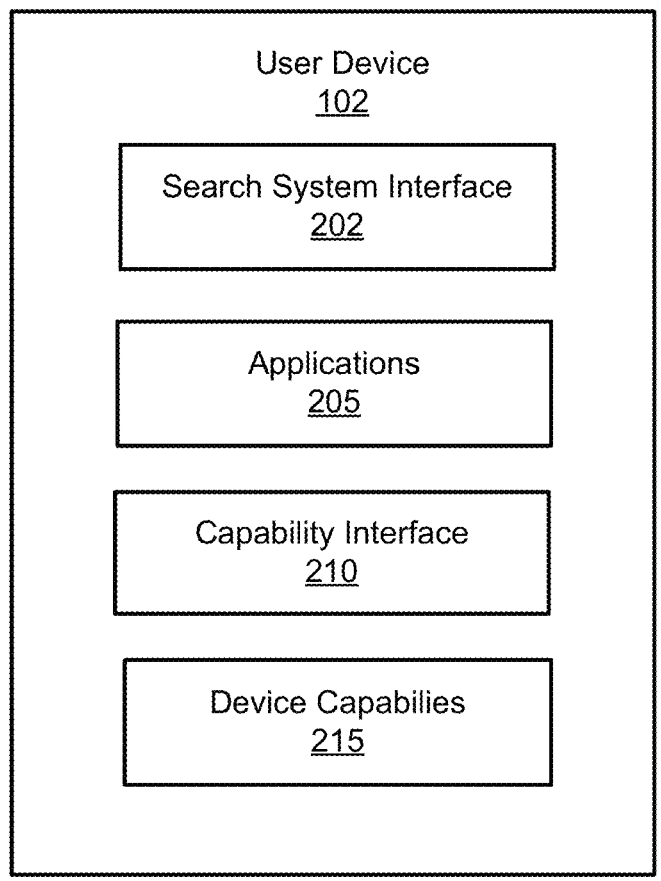
FIG. 2 is a high level block diagram of a user device, according to one embodiment.

FIG. 2 is a high level block diagram of a user device, according to one embodiment. The user device 102 includes a search system interface 202, applications 205, capability interfaces 210 and device capabilities 215. The user device 102 may include more or different modules and components than those illustrated herein. For example, the user device 102 typically includes a display for presenting information to a user of the user device 102, along with various input means such as a touchscreen, keyboard, and so forth. These various devices may also be construed as device capabilities 215 for use by applications as described herein.

The search system interface 202 provides an interface for the user to interface with the search system 100. The search system interface 202 receives queries related to application search from the user of a user device 102. Example user interfaces are provided in FIGS. 9A-9C. The search system interface 202 may additionally add information describing the user device 102 and device capabilities of the user device 102 to the query and provides the query to the search system 100. The search system interface 202 receives the response to the search query from the search system 100 and presents the resulting applications on a user interface to the user of the user device 102.

In one example, the search system interface 202 provides the user a user interface allowing the user to enter a query string, or select one or more search specifications such as a filter. As noted, example user interfaces are provided in FIGS. 9A-9C. The search system interface 202 collects contextual information associated with the user device 102 such as information related to the applications 205 present on the user device 102, information related to the operating system on the user device 102 or information identifying the device capabilities 215 of the user device 102. The search system interface 202 may also monitor application use of device capabilities and indicate which capabilities are frequently used on the device. The search system interface 202 provides the contextual information to the search system 100 along with the query from the user. In one embodiment, the search system interface 202 is provided by a partnering entity. The partnering entity receives a search query from the user regarding application search and queries the user device to determine relevant contextual information. The partnering entity provides the search query and the contextual information to the search system 100.

In one method, the search system interface 202 identifies one or more device capabilities 215 available on the user device 102 by analyzing source code or an application programming interface associated with the operating system on the user device 102. For example, the operating system on the user device 102 may have a function call (e.g., getSensorList( )) for user devices running the ANDROID operating system) for identifying or listing the device capabilities 215 available on the user device 102. The search system interface 202 may perform further identification of device capabilities by requesting further devices or other interfaces available to applications from the operating system. As described above, the device capabilities 215 include devices that may be connected to or wirelessly paired with the user device 102, and are not limited to the physical components permanently joined to the user device 102. In one example, a device capability such as motion-tracking sensors may be paired wirelessly to a user device 102 via a Bluetooth connection.

To determine performance capabilities, the search system interface 202 queries the operating system to identify performance hardware characteristics of the device. The search system interface 202 also performs a performance evaluation in one embodiment. The performance evaluation in one implementation is a benchmarking test that generates a numerical evaluation of the performance of the user device.

Certain device capabilities 215 are not directly accessible by an application 205, and are assessed through a capability interface 210. As described further below, function calls in an application 205 to the capability interfaces 210 are used by the application search system to determine which device capabilities are used by an application and identify application capabilities. The capability interface 210 allows an application 205 to control, manipulate or communicate with a device capability 215 on the user device 102. For example, an application 205 uses an API specified by an operating system (OS) running on a user device 102 to interact with a device capability 215 on the user device 102. Alternatively, the capability interface 210 may interpret instructions received from an application 205 and based on the interpretation of the instructions make a sensor 215 perform an action. The capability interface 210 is typically standardized to a particular library or a particular OS. For example, a camera may be accessed by different capability interfaces 210 using different libraries or differently by different operating systems.

An application 205 may use one or more of the device capabilities 215 to enable functionality provided to the user of the application 205. For example, an application 205 that captures and shares photographs uses a camera on the user device 102 to capture images. The applications 205 on the user device 102 access and use the device capabilities 215 on the user device via capability interface 210. In one embodiment, the binary executable of application 205 includes function calls to the capability interface 210. The function calls specify a request to the capability interface 210 to interact with one or more sensors 215. In one embodiment, the capability interface 210 calls designated in an application binary are identifiable strings. For example, an application 205 binary includes an identifiable string identifying a camera sensor and a function to be performed by the camera sensor.

Figure 3:
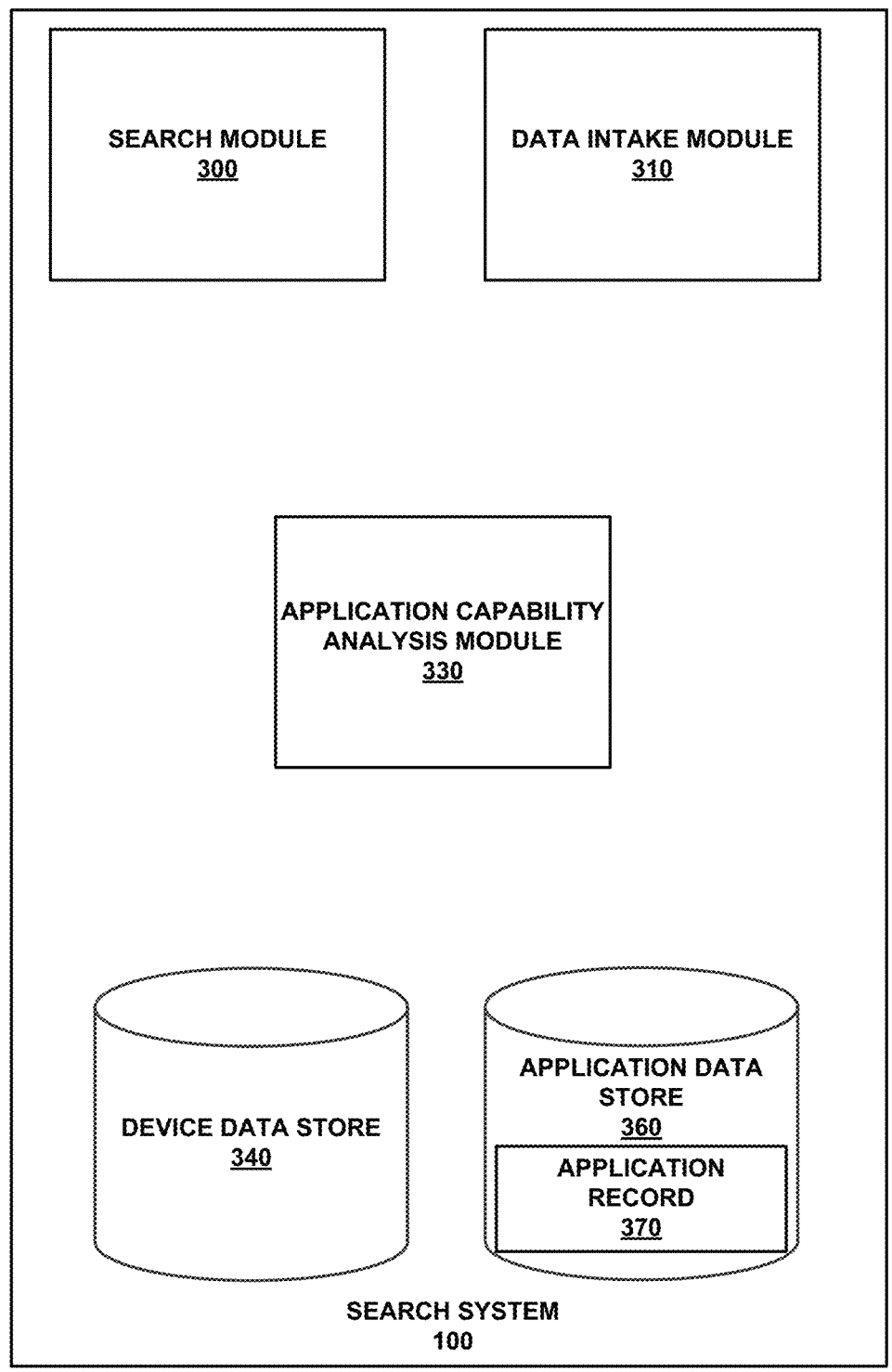
FIG. 3 shows components of a search system according to one embodiment.

FIG. 3 shows components of a search system 100 according to one embodiment. The search system 100 includes various modules and components for performing application searches as described herein. The search system 100 stores data relating to applications in an application data store 360, which identifies data relating to individual applications in an application record 370, which is further described in FIG. 4. The search system includes a data intake module 310 for retrieving information relating to applications and populating the application data store 360. The search system also includes a search module 300 for performing application searches. An application capability analysis module 330 analyzes applications and data relating to applications to determine application capabilities. Device data store 340 includes data describing device capabilities of various user device models and configurations. Each of these components is now further described.

Though shown here as a single system, search system 100 may be implemented as a group of separate systems that together perform the functions described herein. In addition, search system 100 may include more or fewer modules than those described herein in order to perform applications searches incorporating device capabilities of an application. For example, in a configuration wherein the search system 100 receives gaminess values from another system, the search system 100 may omit components that determine a gaminess value, such as the gaminess module 240 and gaminess computer model 250.

The data intake module 210 retrieves data from the application marketplace 106 and one or more of the data sources 114. The data retrieved from the application marketplace 106 and various data sources 114 can include any type of data related to applications. Examples of data related to applications include, but are not limited to, a name of an application, a description of an application, version updates of an application, quantity of purchases of an application, a substantive review of an application, a quality rating of an application, a developer name, an excerpt from a blog post about an application, a tweet about an application, software compatibility information, performance requirements, and one or more images (e.g., icons and/or screenshots) associated with the application. In some configurations, data retrieved from the application marketplace 106 and data sources 114 includes information regarding the functionalities of applications. The data intake module 210 may also retrieve statistical data related to applications. Statistical data may include any numerical data related to the application, such as a number of downloads, download rates (e.g., downloads per month), a number of reviews, a number of ratings, and average rating score.

The data intake module 310 passes data relating to the application capabilities to the application capability analysis module 330. The application capability analysis module 330 analyzes the information relating to an application, including the application executable, to determine application capabilities for an application. In one embodiment, the data received from the data sources 114 includes information about the capabilities and features associated with one or more applications, capabilities used by one or more applications, services provided by one or more applications or reviews of one or more applications. For example, a review of an application can indicate the functional aspects of an application and the utility an application may provide to a user. In one embodiment, at least some of the data received from the data sources 114 may include information identifying capabilities used by one or more applications. In addition, a software application marketplace 106 or other publisher of the application may contain information describing the capabilities used by an application 205 or the features offered by the application. The application capability analysis module 330 analyzes these various pieces of information to determine capabilities of an application and stores the application capability information in an application record 370.

In one example, the application capability analysis module 330 analyzes product reviews and comments to determine performance capabilities of an application. The analysis identifies whether particular operating systems, models, or performance capabilities are associated with good or bad performance and stores that information as application capability information associated with the application record 370. For example, a publisher may indicate "basic" and "recommended" performance levels for a product. Similarly, a review of an application may indicate that the version of an application available for a particular operating system or when executed on a particular device is inferior. These are analyzed and stored with the application record 370 to indicate that certain devices and performance capabilities affect the quality of the application.

In one embodiment, the application capability analysis module 330 analyzes application executables in addition to the information received from the publisher, application marketplace, and other data sources 114. In one method, the application capability analysis module 330 identifies permissions requested by the application to use various capabilities on a user device. That is, if an application requests to use location services, the application capability analysis module 330 identifies the application as using location services. The application capability analysis module 330 may identify the application capabilities of an application using function calls made by the application. In this case, the capability analysis module 330 identifies requests in an application executable to a capability interface 210. In particular, the capability analysis module 330 may identify a string or other identifier in the executable binary that corresponds to a particular capability interface and request. Based on the request to the capability interface, the application capability analysis module 330 determines which capability interface 210 is requested by the application request and identifies associated application capabilities.

In a further example, the application capability analysis module 330 may provide an application to an operator of the search system 100 for manual review and determination of device capabilities. Any of the aforementioned methods may be used, alone or together, to identify application capabilities for an application.

In one embodiment, the search system 100 retrieves data associated with one or more user devices 102 from one or more data sources 135 and stores data relating to the device capabilities in device data store 340. As described below, the device data store may be used to identify device capabilities based on device model identification or other information provided with a search query. Examples of data associated with the user devices 102 retrieved by the search system 100 include, operating systems compatible with a user device 102, capabilities available on the user device 102, a device ID identifying the user device 102 or other information associated with the capabilities available on the user device 102.

The application data store 360 includes a variety of different types of data related to different applications. The application data store 360 may include one or more databases, indices (e.g., inverted indices), files, or other data structures that may be used to implement the techniques of the present disclosure. As described herein, the data included in the application data store 360 may include descriptions of applications, application scoring features, application capabilities, and other information. The search system 100 is configured to generate and update the data in the application data store 360 based on the data retrieved from the application marketplace 106 and data sources 114. For example, the search system 100 may use the retrieved data to update one or more databases, indices, files, or other data structures included in the application data store 360. As described herein, the application data store 360 may include a plurality of application records 370. The search system 100 may generate new application records and update existing application records 370 based on the data retrieved from the application marketplace 106 and data sources 114. In some examples, some data included in the application data store 370 may be manually generated.

Figure 4:
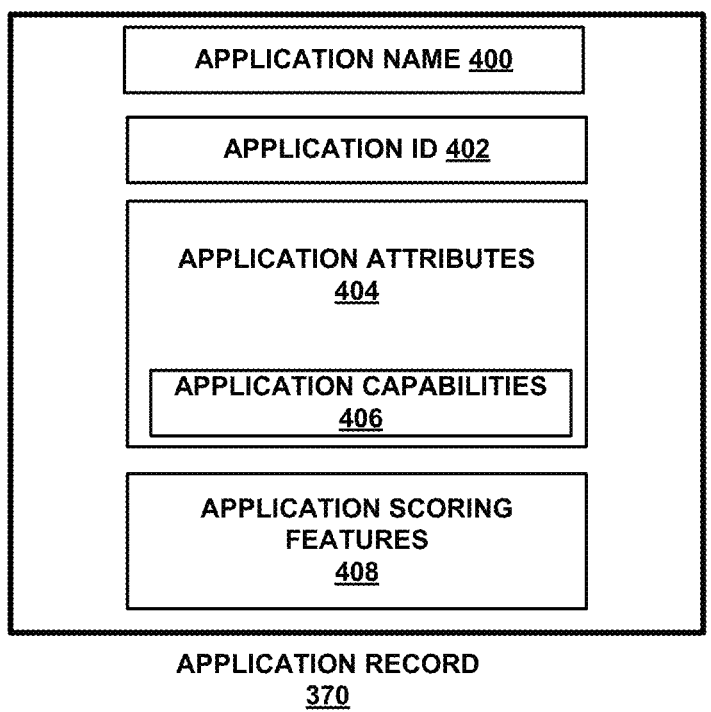
FIG. 4 illustrates the components of an application record according to one example embodiment.

FIG. 4 illustrates the components of an application record according to one example embodiment. FIG. 4 shows example data which may be stored in the application data store 360. The application record 370 may generally represent data stored in the application data store 360 that is related to an application. The application data store 360 may include data related to a plurality of applications. The search system 100 (e.g., the data intake module 310 and application capability analysis module 330) may generate the data included in the application data store 360.

The example application record 370 includes an application name 400, an application identifier 402, application attributes 404, application capabilities 406, and application scoring features 408. The application data store 360 may include a plurality of application records having a similar structure as the application record 370. The application name 400 is the name of the application represented by the data in the application record 370. Example application names include "Google Maps," "Facebook," "Twitter," "Microsoft Word", or "Angry Birds Space." The application ID 402 identifies the application record 370 among the other application records 370 included in the application data store 360. For example, the application ID 402 may uniquely identify the application record 370. The application ID 402 may be a string of alphabetic, numeric, and/or symbolic characters (e.g., punctuation marks) that uniquely identifies the application record 370.

The application attributes 404 may include a variety of different types of data associated with the application represented by the application record 370. For example, the application attributes 404 may include structured, semi-structured, and/or unstructured data. The application attributes 404 may include information that is extracted or inferred from the application marketplace 106 and/or from the data sources 114. In some examples, the application attributes 404 may include data that is manually generated. The application attributes 404 may be updated by the data intake module 310 so that up-to-date results can be provided in response to a user search query.

The application attributes 404 may include the name of the developer of the application, the publisher of the application, a category of the application (e.g., communications), a description of the application (e.g., a developer's textual description), a version of the application, the operating system for the application, and the price of the application. The application attributes 404 may also indicate security or privacy data about the application, battery usage of the application, and bandwidth usage of the application. The application attributes 404 may also include information retrieved from websites such as reviews associated with the application, articles associated with the application (e.g., wiki articles), or other information. The application attributes 404 may also include digital media related to the application, such as images (e.g., icons and/or screenshots). The application attributes 404 may also include the device capabilities 406.

The application record 370 may include application scoring features 408. The application scoring features 408 may include any of the application attributes included in the application record or any additional parameters related to the application, such as data indicating the popularity of an application (e.g., number of downloads) and the ratings (e.g., number of stars) associated with an application. The search module 300 may use the application scoring features 408 to generate result scores for the application associated with the application record 370. In some implementations, application scoring features 408 may not be stored in the application data store 360. Instead, application scoring features 408 may be generated when a search request is received by the search system 100.

Responsive to receiving a search query received from a user device 102 or some other entity, the search system 100 identifies a set of applications that are determined to be at least partially aligned with an intent of the search query. This search functionality is implemented by search module 200. The search module 200 may use the application scoring features to generate results scores for search results. Accordingly, in one embodiment the search module 200 generates result scores based on application capabilities as an application scoring feature. The search module 200 may also generate result scores based on other scoring features, such as query scoring features, application-query scoring features, and application scoring features as further described below.

Figure 5:
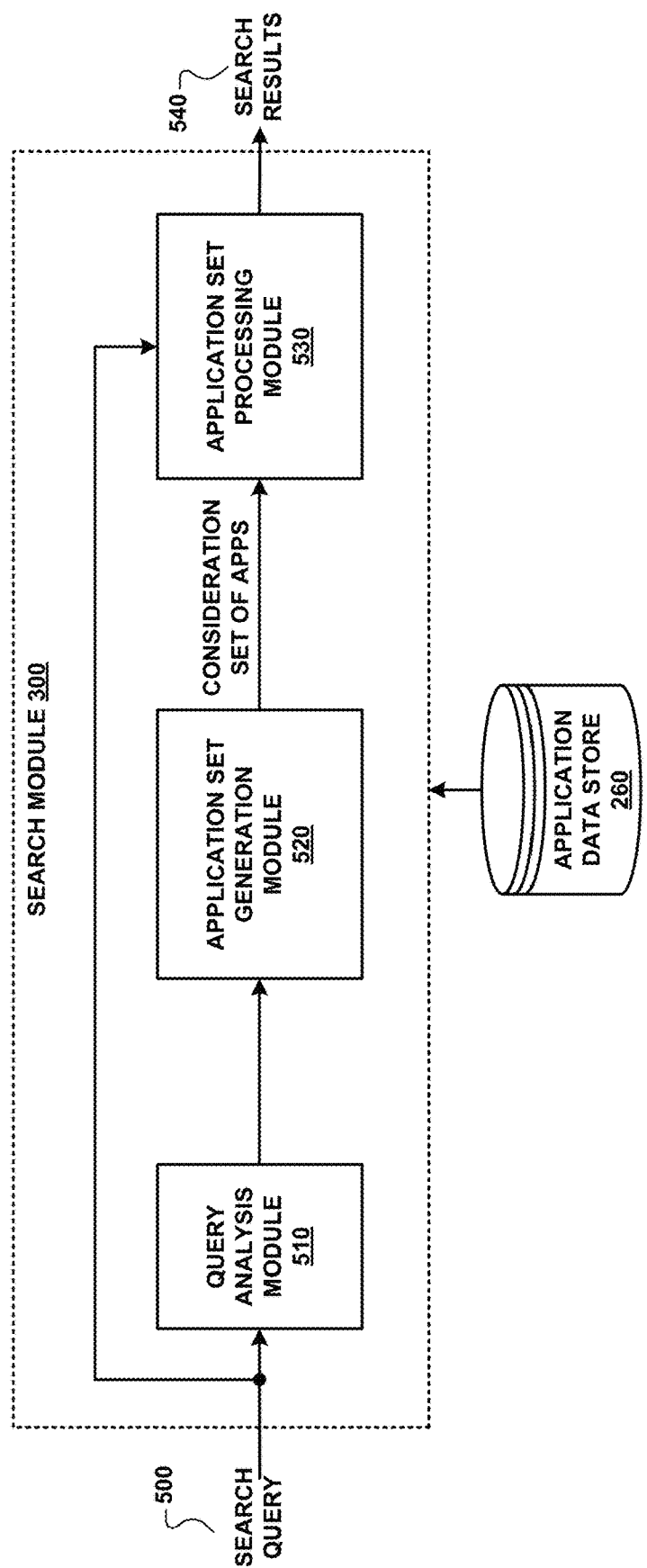
FIG. 5 shows an example search module which may be included in the search system 100.

FIG. 5 shows an example search module 200 which may be included in the search system 100. The application search module 200 includes a query analysis module 510, an application set generation module 520 (hereinafter "set generation module 520"), and an application set processing module 530 (hereinafter "set processing module 530"). The query analysis module 510 analyzes a received search query 500. The set generation module 520 identifies a set of applications (e.g., application records) based on the received search query 500. The identified set of applications is referred to herein as a "consideration set." The set processing module 530 processes (e.g., scores) the consideration set to generate a set of search results 540 that may include a list of applications along with corresponding result scores used to rank the applications in the list.

The search query 500 may be a search query entered by a user on a user device 102. The search query 500 includes text, numbers, and/or symbols (e.g., punctuation) entered into the user device 102 by the user. For example, the user may have entered the search query 500 into a search field (e.g., a search box) of an application running on the user device 102 using a touch screen keypad, a mechanical keypad, and/or via speech recognition, or the search query might be implicit, generated by an agent or automated script. The search results 540 generated by the application search module 110 may be transmitted back to the user device 102 that provided the search query 500.

Although the search system 100 (e.g., the query analysis module 510) is illustrated and described herein as receiving a search query 500 that includes text, the search system 100 (e.g., the query analysis module 510) may receive additional data along with the search query 500. The search query 500 and the additional data along with the search query 500 may be referred to as a query wrapper. In some examples, the query wrapper may include contextual information associated with the search query 500, such as platform constraint information (e.g., operating system version, device type, browser version), geo-location preferences, partner specific information (e.g., which services are being used to access the search system 100), and other information. A user device 102 may generate and transmit the additional data included in a query wrapper at the time the user device 102 transmits the search query 500.

The search query 500 may include, within the search query 500, terms that indicate an intent to search for application capabilities. For example, the search query may include terms such as "location" or "gyroscope controls" or similar. The search module 300 may match terms in a search query to a dictionary of terms associated with each device capability to determine a user's intent for an application capability based on matches with terms in the dictionary. Other methods may also be used, such as through a trained computer model (machine learning) for identifying search intent. In addition, a user's intent to search for an application capability may be designated by the query wrapper accompanying the search query, indicating that the user expressly selected a device capability for the search. For example, the user may have selected a device capability present on the requesting user device 102 for the search. The user's intent to search for particular application capabilities may be used to generate a consideration set of applications or to generate result scores associated with application search results.

Thus, a variety of algorithms may be used to identify the functionality associated with an application from the words in a query string, such as key word matching, string matching, category matching and other search algorithms. This matching may be based on matching of the terms to terms associated with particular capabilities. For example, a camera sensor may be associated with terms such as "picture," "photograph" or "video." When a user enters search terms, a match between these terms and the search query is used to infer a user may be interested in an application using a camera sensor.

The query analysis module 510 receives the search query 500 from a user device 102. The query analysis module 510 may perform various analysis operations on the received search query 500. For example, analysis operations performed by the query analysis module 510 may include, but are not limited to, tokenization of the query, filtering of the query, stemming, lemmatization, synonymization, categorization, entity parsing and stop-word removal. In one configuration of the query analysis module 510, the search query 500 is also analyzed to identify an expressed application capability intent. As described above, the expressed application capability intent may be identified from the received search query 500 based on terms of the search query, such as "tilt control" or "Bluetooth heart rate monitor" identified in the query wrapper. The expressed application capability intent represents whether the user specifically searched for a particular application capability.

The set generation module 520 identifies a set of applications (i.e., the consideration set) based on the search query 500. In some examples, the set generation module 520 may identify the set of applications by identifying application records based on matches between terms of the search query 500 and terms in the application records. For example, the set generation module 520 may identify a set of applications in the application data store 360 based on matches between tokens generated by the query analysis module 510 and words included in the application records. The consideration set of applications may be a list of application records in some examples. For example, the consideration set may be a list of application IDs and/or a list of application names. In one embodiment, the set generation module 520 uses the application capabilities to exclude or include that application in the consideration set. This inclusion or exclusion may be based, for example, on the expressed application capability intent. Thus, in one embodiment, when the user expresses intent to search for a particular application capability intent, the set generation module 520 excludes applications that do not include that application capability. Similarly, when the user does not include an expressed application intent, applications may be searched without considering the application capability.

The set processing module 530 performs a variety of different processing operations on the consideration set to generate a set of search results 540 that includes a list of applications. In some implementations, the set processing module 530 may generate a result score for each of the applications included in the consideration set in order to generate the set of search results 540. In these implementations, the set of search results 540 may include a list of applications (e.g., application IDs and/or application names), each of which is associated with a corresponding result score. In some examples, the search results 540 may include all of the applications from the consideration set. In other examples, the search results 540 may include a subset of the consideration set. For example, the subset may be those applications having the largest result scores.

The information conveyed by the search results 540 may depend on how the result scores are calculated by the set processing module 530. For example, the result scores may indicate the relevance of an application to the search query, the popularity of an application in the marketplace, the quality of an application, or other properties of the application, depending on what parameters the set processing module 530 uses to score the applications.

The set processing module 530 may generate result scores for applications in a variety of different ways. In general, the set processing module 530 may generate a result score for an application based on one or more scoring features. The scoring features may be associated with the application and/or the search query 500.

An application scoring feature may include any data associated with an application. For example, application scoring features may include any of the application attributes included in the application record or any additional parameters related to the application, such as data indicating the popularity of an application (e.g., number of downloads) and the ratings (e.g., number of stars) associated with an application. In one embodiment, the search query or an expressed application capability intent may also be included to determine the scoring of applications by the application set process module 530, which may assess application capabilities as an application scoring feature. Thus, in this configuration the scoring features of an application include the application capability 406 as a factor for determining relevance of the search results (the result score), in particular when the search query 500 has an application capability intent.

A query scoring feature may include any data associated with the search query 500. For example, query scoring features may include, but are not limited to, a number of words in the query, the popularity of the query, and the expected frequency of the words in the query. An application-query scoring feature may include any data which may be generated based on data associated with both the application and the search query 500 (e.g., the query that resulted in identification of the application record by the set generation module 520). For example, application-query scoring features may include, but are not limited to, parameters that indicate how well the terms of the query match the terms of the identified application record. The set processing module 530 may generate the query scoring features and/or the application-query scoring features. The set processing module 530 may generate a result score for an application based on at least one of the application scoring features, the query scoring features, and the application-query scoring features.

The set processing module 530 may determine a result score based on one or more of the scoring features listed herein and/or additional scoring features not explicitly listed. In some examples, the set processing module 530 may include a function that receives one or more of the scoring features as input. The function may also be based on scoring features that incorporate a number of downloads of the application, term frequency-inverse document frequency (TFIDF) scoring, text matches between search query terms and application title, and the number of words in the description of the application, for example. Although an example function may include the above listed features, other functions incorporating different features may be used by the set processing module 530.

In some examples, the set-processing module 530 may include one or more machine learned models (e.g., a supervised learning model) configured to receive one or more scoring features. The one or more machine learned models may generate result scores based on at least one of the application scoring features, the query scoring features, and the application-query scoring features. For example, the set processing module 530 may pair the search query 500 with each application and calculate a vector of features for each (query, application) pair. The vector of features may include application scoring features, query scoring features, and application-query scoring features. The set processing module 530 may then input the vector of features into a machine-learned regression model to calculate a result score that may be used to rank the application in the search results 540 for the search query 500. In some examples, the set processing module 530 may input the vector of features along with a corresponding set of human curated scores into a machine-learned regression model to calculate a result score.

In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

In one embodiment, the result scores are adjusted or post-processed after the result score is generated from the machine-learned result score model. In this embodiment, the result scores may be adjusted based on a match between an application capability intent and the application capabilities 406 of the applications. For example, a matching intent to the application capability may increase the result score of an application.

The device capabilities of the user device requesting the application search may also be used to determine the relevance scores of a search result. For example, an application that accesses specific device capabilities may be particularly relevant to the user. By contrast, an application that uses a large number of capabilities may be considered malicious and given a low ranking when presented to the user or identified as malicious and not recommended to the user. Similarly, an application may be given a high ranking if the user device 102 is capable of providing all the capabilities used by the application, thereby allowing the user to access all features provided by the application. For example, an application that allows the use of both the front facing and back facing camera of a smartphone is given a higher rank when presented to the user of a smartphone with a front facing and back facing camera, but may be given a lower rank when presented to a user of a front facing camera. The device capabilities may also affect the ranking or scoring based on the parameters of the capability. For example, reading applications may be considered more relevant for a device that incorporates an e-paper display, while games may be lower ranked for displays with a low refresh rate.

In another example, an application may be designed to work with a parameter indicating it permits three simultaneous touches on a touchscreen, but can also accommodate screens with a single touch point. Based on information gathered by the data intake module 310, the application capabilities for this application may indicate the performance using one touch point are not as satisfactory. The scoring of this application may be affected based on the number of touch points permitted by the requesting device.

In addition, the performance capabilities of the device may also be considered to determine relevance. Specifically, an application with application capabilities indicating inferior performance with particular performance capabilities may be considered less relevant when a device requesting the search has those performance capabilities. Similarly, the device capability usage information may be provided with the search query, indicating that a user frequently uses a particular device capability, such as a gyroscopic control. This usage information may be normalized relative to other users' frequency and used to increase rankings of capabilities the user frequently uses more often than the norm.

In one embodiment, the applications provided to the user device 102 are ranked based on specialized capabilities used by the user device 102 or paired to the user device 102. Specialized capabilities may be designated manually or are automatically selected as capabilities not commonly available on a user device 102 and may have a set of applications tailored to enhance the user's experience with the specialized sensor. Examples of specialized device capabilities include motion-tracking sensors, fitness sensors or other sensors paired to the user device 102, or a combination of one or more sensors such as a forward facing camera and a backward facing camera on a user device 102. A sponsor may also pay to promote the ranking of applications that match such specialized capabilities on a user's device, such as promoting fitness applications to devices with heart rate sensing capabilities.

In another embodiment, the search module 300 identifies one or more applications that use the functionality provided by a capability as similar applications. For example, the search module 300 may identify car racing game applications, jumping game applications, running game applications, and first person shooter applications that use an accelerometer as similar applications. In addition to providing the user of the user device 102 with applications identified based on the search query received from the user device 102, the search system 100 may also provide the user with a list of similar applications. The similar applications may provide different functionality than the identified applications, but they use the same capabilities as the identified applications, thereby informing the user of other available applications that are compatible with the capabilities on the user device 102.

The results scores may be used in a variety of different ways. In some examples, the result scores may be used to rank the applications in a list of results that is presented on a user device 102. In these examples, a larger result score may indicate that the application is more relevant to a user than an application having a smaller result score. In examples where the search results 540 are displayed as a list on a user device 102, the applications associated with larger result scores may be listed nearer to the top of the results list (e.g., near to the top of the screen). In these examples, applications having lower result scores may be located farther down the list (e.g., off screen) and may be accessed by a user scrolling down the screen of the user device 102.

In some implementations, the set of search results 540 may be transmitted to a user device 102 that generated the search query 500 upon which the search results 540 are based. The search results 540 may be formatted on a user device 102 as a list of applications matching the search query 500. The search results 540 may include any suitable information corresponding to the various applications. For example, the search results 540 provided by the search system 100 to a user device 102 may be formatted as a list of applications, including, for example, a name of the application, an image associated with the application (e.g., a logo, a screenshot, and/or a video), a link to download the application, a description and rating of the application, and/or other information.

In a configuration, the search results 540 transmitted to the user device 102 may also separate applications matching an identified application capability and applications that do not match an identified application capability into distinct lists for presentation on the user device 102.

Although the search system 100 may transmit the search results 540 to a user device 102 in some implementations, in other implementations, the search system 100 may use the search results 540 in a different manner. For example, the search system 100 may use the search results 540 as a basis for generating advertisements for the user. The search system 100 may select which of the search results 540 to transmit to a user device 102 in some examples. For example, the search system 100 may only transmit the highest ranked search result to a user device 102 in some examples.

Figure 6:
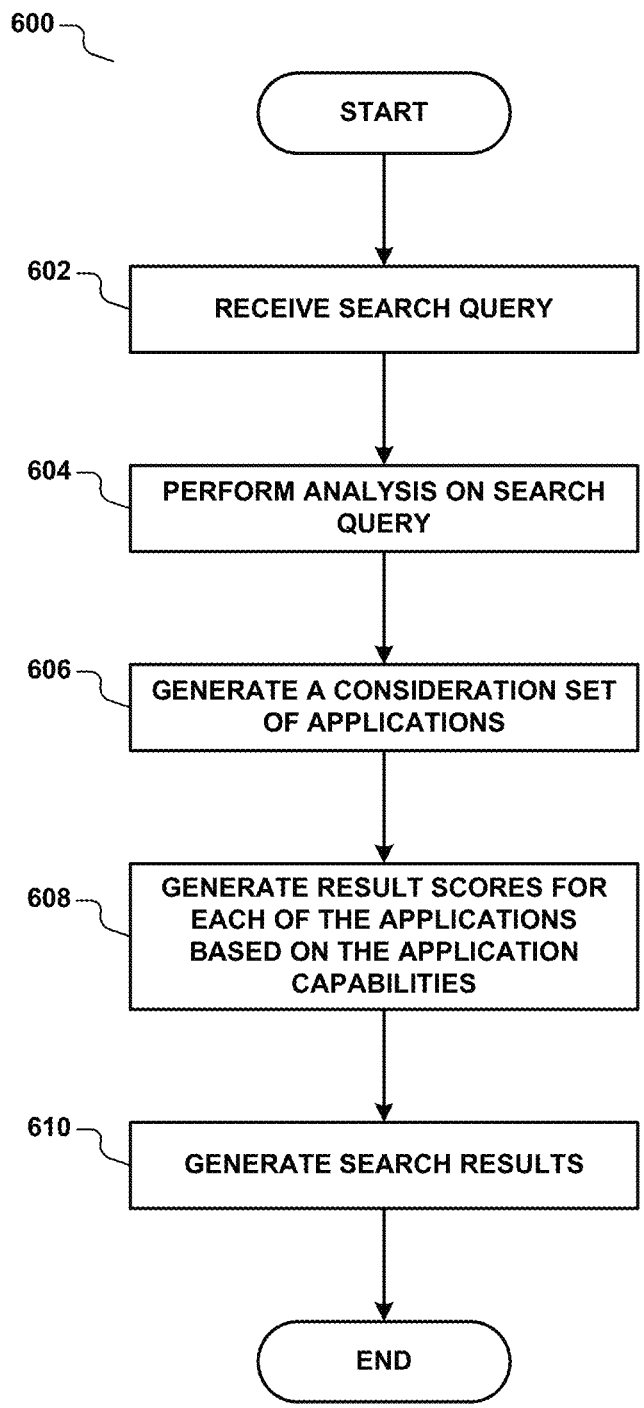
FIG. 6 shows an example method for performing a search based on a received search query.

FIG. 6 shows an example method 600 for performing a search based on a received search query. The method 600 is performed in one embodiment by the application search module 200 of FIG. 5. In block 602, the query analysis module 510 receives a search query 500 that was generated by a user device 102. In block 604, the query analysis module 510 analyzes the search query 500 and may determine whether the search query includes an application capability search intent. In block 606, the set generation module 520 identifies a consideration set of applications (e.g., a set of application records) based on the search query 500 (e.g., based on output from the query analysis module 510). As noted above, the consideration set of application may include or exclude applications based on a match between the application capabilities and an identified application capability search intent.

In block 608, the set processing module 530 generates result scores for each application in the consideration set based on scoring features, such as query scoring features, application-query scoring features, and application scoring features. One or more of the application scoring features may be derived from the application capabilities of the application as described above. In block 610, the set-processing module 530 generates a set of search results 540. The search results 540 may include a list of applications and associated result scores. The search system 100 may then transmit the search results 540 to a user device 102 in some examples.

Figure 7:
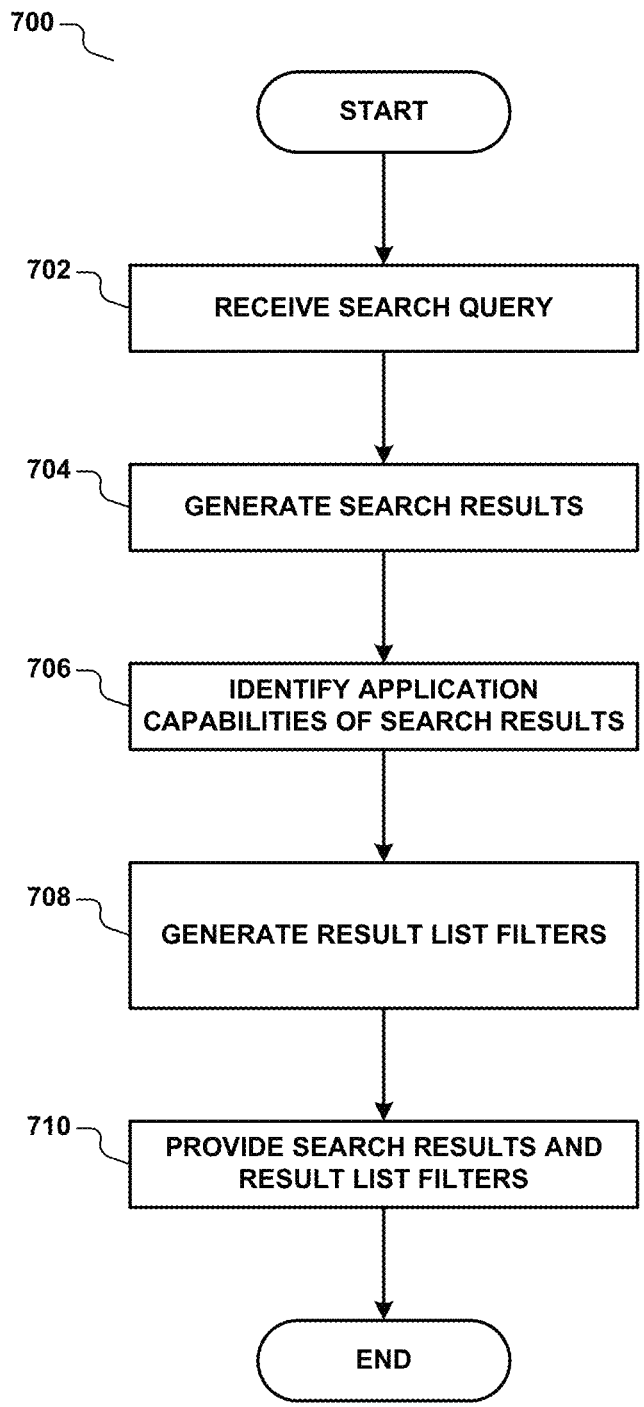
FIG. 7 illustrates a method of generating application capability filters for a set of application search results according to one embodiment.

FIG. 7 illustrates a method of generating application capability filters for a set of application search results according to one embodiment. As described above with respect to FIG. 6, the search module 300 receives 702 a search query and generates 704 search results. The generated search results may be generated using application capabilities as noted in FIG. 6, or the search results may not be based on application capabilities. Using the search results relevant to the search query, the search module 300 identifies application capabilities of the search results and determines application capabilities in common between the search results. For example, particular application capabilities may be tallied to determine the number and frequency of particular application capabilities.

Using the application capabilities of the results list, a set of result list filters are generated 708 by the search module 300. In one embodiment, all application capabilities associated with the applications in the result list are used to generate result list filters. In another embodiment, certain application capabilities may be selected, such as a number of the most common application capabilities, the least common application capabilities, or a combination of the two. The result list filters may also be matched against device capabilities to exclude result list filters that correspond to capabilities that are not offered by the user's device.

In one embodiment, the user selectable filters are ranked. For example, filters that represent a specialized sensor are given a higher rank than ones that do not represent a specialized sensor. Alternatively, filters may be ranked based on a sponsor fee received from a particular sponsor associated with the sensor represented by the filter. For example, one of the user selectable filters presented to the user is a motion-tracking sensor filter that allows the user to view applications in the search results that use the motion-tracking sensor paired to the user device 102. A sponsor associated with the motion-tracking sensor may sponsor the motion-tracking sensor user selectable filter, resulting in the motion-tracking sensor user selectable filter being presented to the user ahead of other sensor based user selectable filters. The filters may also be ranked according to usage information indicating the frequency with which a user uses particular capabilities. This frequency may be calculated relative to the frequency of use by other users.

The search results and result list filters 710 are provided to the user device 102 for presentation to the user. At the user device, the search results and result list filters may be displayed to the user, and the user may select among the result list filters to filter application capabilities.

Figure 8:
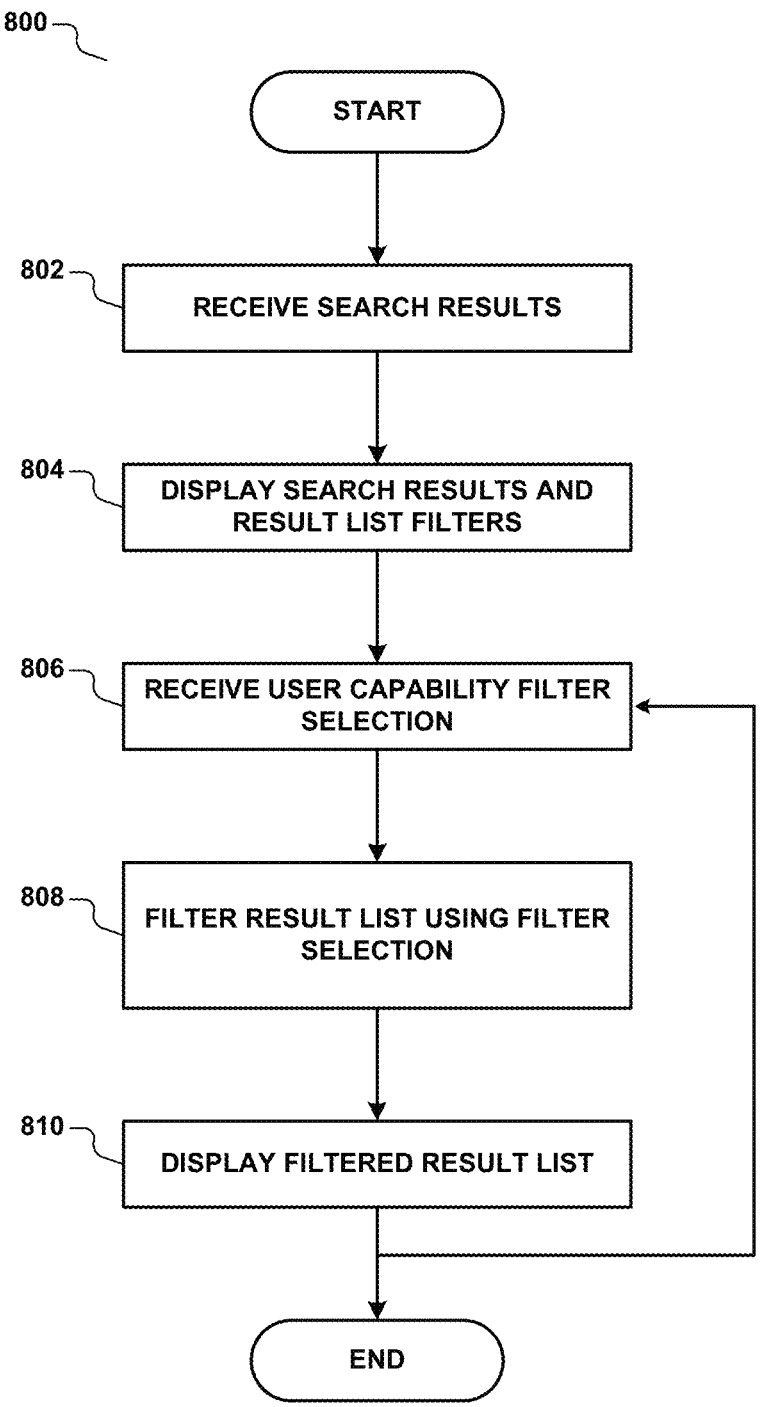
FIG. 8 illustrates a method of displaying and updating a result list according to one embodiment.

FIG. 8 illustrates a method of displaying and updating a result list according to one embodiment. The method shown in FIG. 8 is typically performed by the user device 102, for example by the search system interface 202. The search system interface 202 receives 802 search results from the application search system 100. The search results and result list filters are displayed 804 to a user of the device. Initially, if no filters are selected, all search results are displayed to the user. The user may enter and the search system interface 202 may receive 806 a selection of a capability filter. Using the capability filter, the result list is filtered 808 to exclude filters that do not include the capability designated by the capability filter. The filtered result list is displayed 810 to the user and the user may provide subsequent selections of additional capability filters to further parse the results.

Figure 9A:
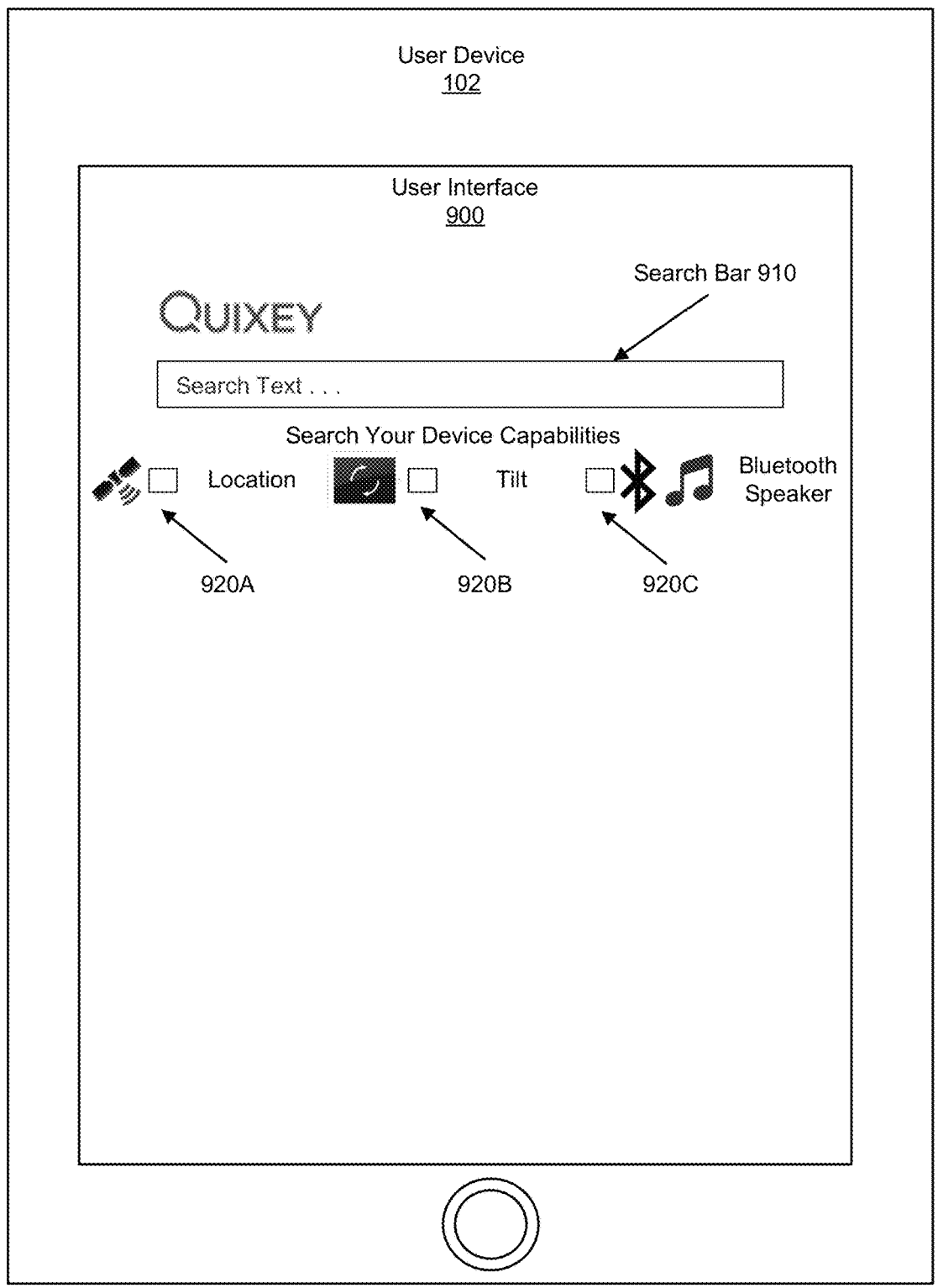
FIGS. 9A-9C provide example user interfaces for performing application search and viewing results that incorporate application capabilities according to one embodiment.
Figure 9B:
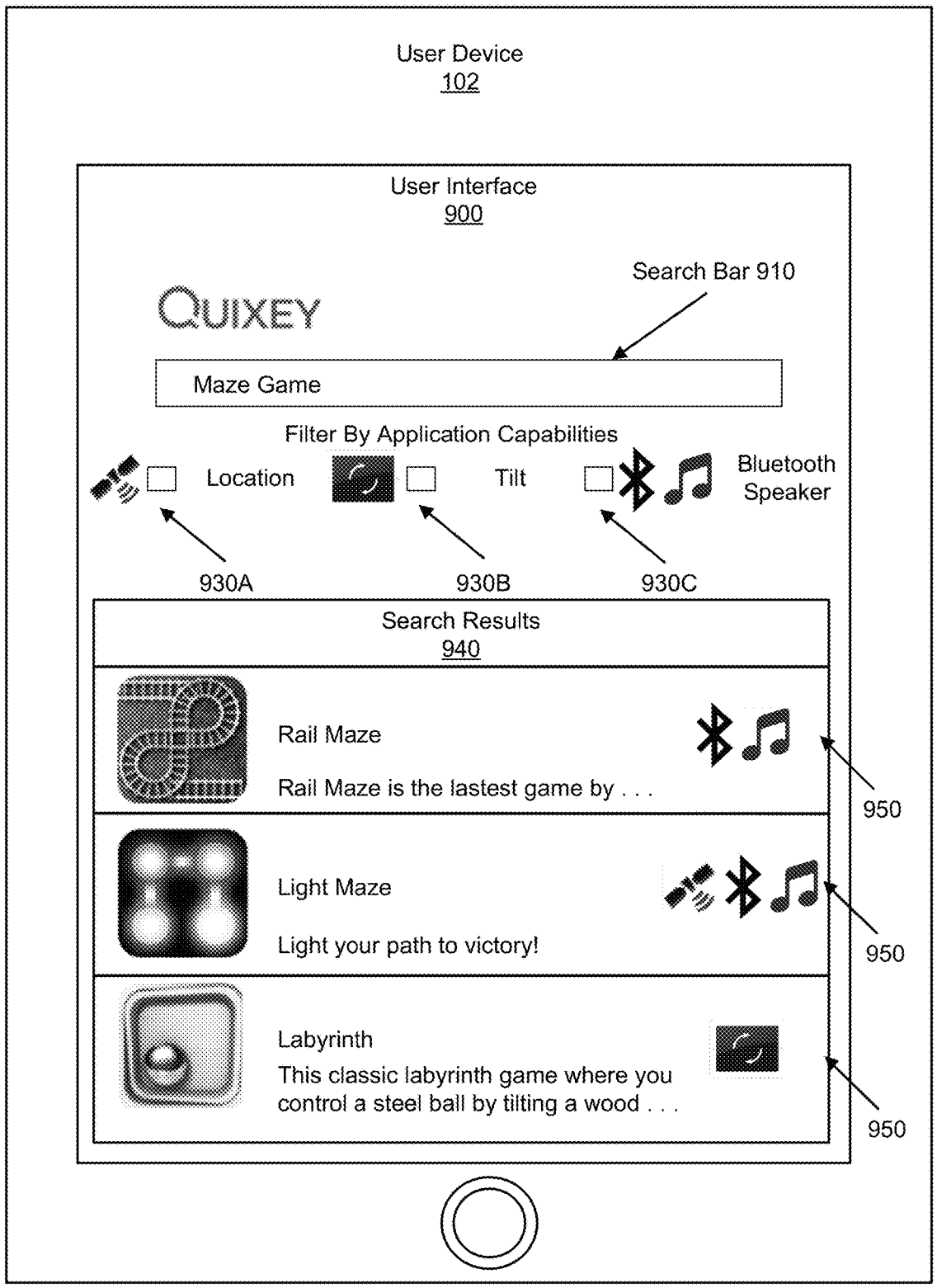
Figure 9C:
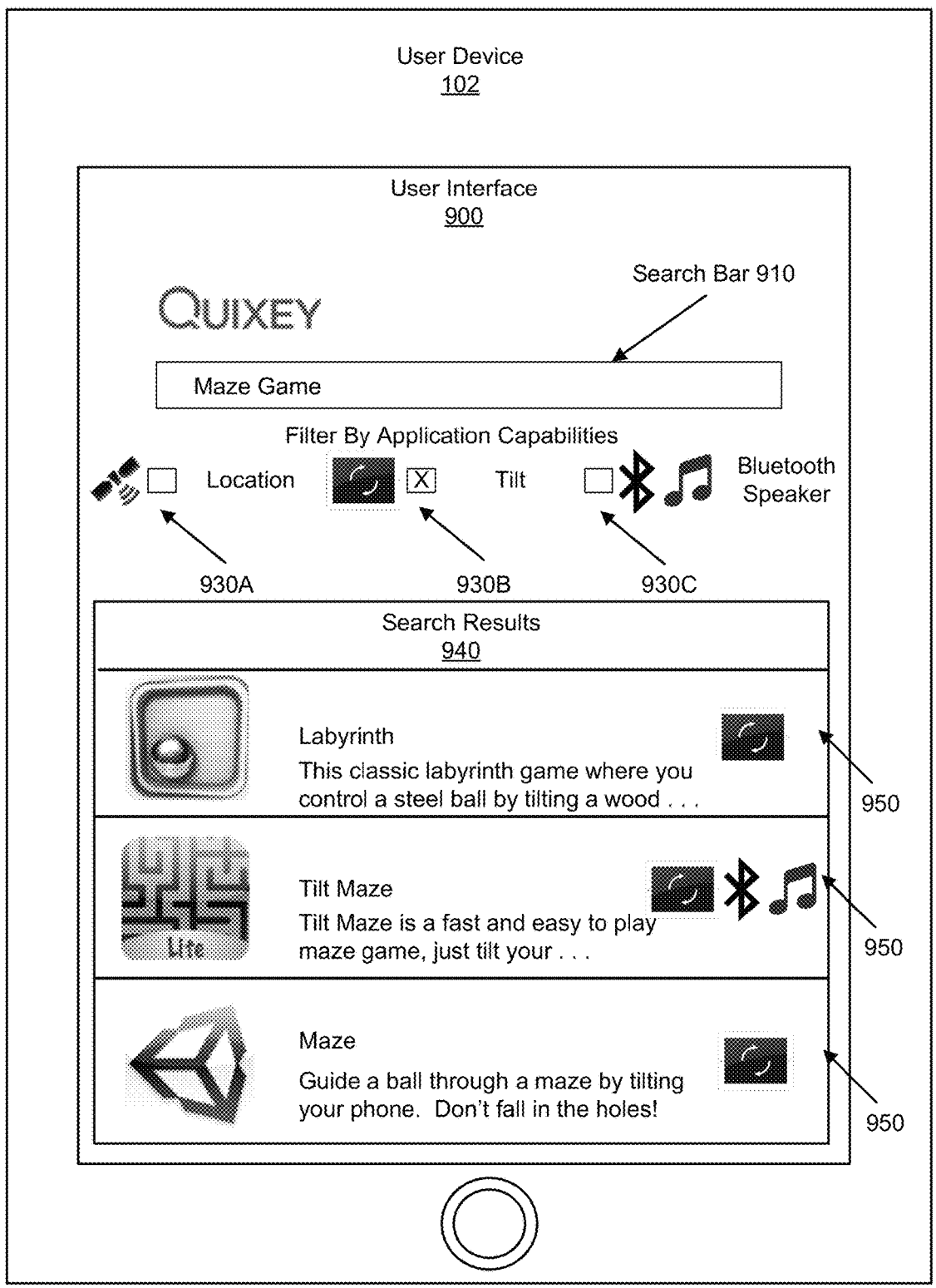

FIGS. 9A-9C provide example user interfaces for performing application search and viewing results that incorporate application capabilities according to one embodiment. In FIG. 9A, a user interface 900 is shown for entering a search query for the application search system 100. The search system interface 202 typically provides the user interfaces shown in FIGS. 9A-9C. FIG. 9A shows a search bar 910 for entering a search query. The user interface also includes device capability selections 920, in this case a device capability for location 920A, for gyroscopic sensors (tilting) 920B, and for a paired Bluetooth speaker 920C. The device capability selections 920 are generated by the search system interface 202 after identifying the device capabilities of the user device 102. While only three device capability selections 920 are shown here, in other embodiments all device capabilities of the device may be shown, or the user may select from among a drop-down list or other selection area. The user's search query and any selected device capabilities are sent to the search system 100 for performing an application search.

FIG. 9B illustrates a user interface including search results 940 received from the application search system 100. Along with the search results, each application is displayed with an indication of application capabilities 950 associated with that application. Application Filters are also displayed 930, indicating application capabilities associated with the applications that the user may use to select particular capabilities. FIG. 9C illustrates the user interface of FIG. 9B after the user selects an application capability filter 930B for "tilt" application capabilities. The search results are filtered for other results that use an application capability that use a gyroscopic sensor. This permits a user to select device capabilities and quickly find other results that use particular capabilities of the user device.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in the Figures. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), system on a chip (SoC), chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating search results based on identified application editions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   identifying a set of hardware components of user devices that are used by each of one or more applications when the respective applications are executed by the user devices, wherein the set of hardware components of the user devices include:
      hardware input components of the user devices, and
      hardware output components of the user devices;
   receiving an application search query from a first user device;
   analyzing text of the application search query to identify one or more query terms, wherein the one or more query terms include configuration information of the first user device;
   determining one or more hardware components associated with the application search query based on the configuration information;
   selecting, from the one or more applications, candidate applications based on a comparison of hardware components used by each of the one or more applications and the one or more hardware components; and
   providing results, including metadata of the selected candidate applications, to the first user device for presentation on the first user device,
   wherein the configuration information indicates at least one of a device type of the first user device or functions enabling interaction of an operating system of the first user device with hardware components.

2. The method of claim 1, further comprising ranking the selected candidate applications, wherein the ranking is based at least in part on a match between the one or more hardware components and hardware components used by a respective candidate application.

3. The method of claim 1, wherein the determining of the one or more hardware components includes determining the one or more hardware components based on the device type of the first user device.

4. The method of claim 1, wherein the determining of the one or more hardware components further comprises:
   identifying, based on the functions enabling interaction of the operating system of the first user device with hardware components, a hardware component of the first user device; and
   associating the hardware component of the first user device with the application search query.

5. The method of claim 1, further comprising generating, based on the hardware components used by the selected candidate applications, a set of user selectable filters for hardware components.

6. The method of claim 5, further comprising, in response to selection of a user selectable filter:
   filtering the selected candidate applications based on the selected user selectable filter; and
   sending the filtered candidate applications to the first user device.

7. The method of claim 5, further comprising ranking the set of user selectable filters.

8. The method of claim 7 wherein the ranking comprises:
ranking the user selectable filters based on the one or more hardware components associated with the application search query or a sponsor associated with one or more user selectable filters in the set of user selectable filters.

9. The method of claim 8, wherein the ranking is further based at least in part on a hardware component use frequency of hardware components on the first user device.

10. The method of claim 1, wherein the identifying of the set of hardware components comprises:
identifying, based on data associated with one or more applications received from one or more data sources, the set of hardware components.

11. The method of claim 1, wherein the identifying of the set of hardware components comprises:
identifying, based on hardware component permissions requested by the one or more applications, the set of hardware components.

12. The method of claim 4, wherein the identifying of the hardware components used by a first application of the one or more applications comprises:
identifying, based on executable code or libraries associated with the first application, the hardware input components used by the first application.

13. The method of claim 1, further comprising:
ranking the selected candidate applications prior to providing the selected candidate applications to the first user device.

14. The method of claim 13, wherein the ranking comprises:
ranking the selected candidate applications based on a number of hardware components used by the selected candidate applications or a number of specialized hardware components used by the selected candidate applications.

15. A non-transitory computer-readable storage medium storing computer program instructions executable to perform steps comprising:
identifying a set of hardware components used by one or more applications;
receiving an application search query from a first user device;
analyzing text of the application search query to identify one or more query terms, wherein the one or more query terms include configuration information of the first user device;
determining one or more hardware components associated with the application search query based on the configuration information;
selecting, based on the application search query, one or more candidate applications of the one or more applications, wherein each of the selected candidate applications uses at least one of the one or more hardware components;
generating, based on the hardware components used by the selected candidate applications, a set of user selectable filters; and
providing the selected candidate applications and the set of user selectable filters to the first user device for presentation on the first user device,
wherein the configuration information indicates at least one of a device type of the first user device or functions enabling interaction of an operating system of the first user device with hardware components.

16. The non-transitory computer-readable storage medium of claim 15, wherein the identifying of the set of hardware components comprises:
identifying the set of hardware components based on data associated with the one or more applications received from one or more data sources.

17. The non-transitory computer-readable storage medium of claim 15, wherein the identifying of the set of hardware components comprises:
identifying the set of hardware components based on sensor permissions requested by the one or more applications.

18. The non-transitory computer-readable storage medium of claim 15, wherein the identifying of the set of hardware components comprises:
identifying the set of hardware components based on binary libraries associated with the one or more applications.

19. The non-transitory computer-readable storage medium of claim 15, wherein the application search query includes at least one of a query string, one or more search specifications, or information of hardware components on the first user device.

20. The non-transitory computer-readable storage medium of claim 15, wherein the determining of the one or more hardware components comprises:
identifying one or more functions of the first user device based on the functions enabling interaction of the operating system with hardware components on the first user device; and
associating the hardware components on the first user device with the application search query.

21. The non-transitory computer-readable storage medium of claim 15, wherein the generating of the set of user selectable filters comprises:
filtering the selected candidate applications based on the user selectable filters.

22. The non-transitory computer-readable storage medium of claim 15, wherein the computer program instructions further include instructions executable for:
organizing selected candidate applications based on hardware components on the first user device.

23. The non-transitory computer-readable storage medium of claim 15, wherein the computer program instructions further include instructions executable for:
ranking the selected candidate applications prior to providing the selected candidate applications and the set of user selectable filters to the first user device.

24. The non-transitory computer-readable storage medium of claim 23, wherein the computer program instructions further include instructions executable for:
ranking the selected candidate applications based on a number of the at least one of the hardware components used by the selected candidate applications, a number of specialized hardware components used by the selected candidate applications, information describing functionality of the selected candidate applications, and sponsorship associated with the selected candidate applications.

25. The non-transitory computer-readable storage medium of claim 15, wherein the computer program instructions further include instructions executable for:
ranking the set of user selectable filters.

26. The non-transitory computer-readable storage medium of claim 25, wherein the computer program instructions further include instructions executable for:

ranking the set of user selectable filters based on the one or more hardware components associated with the application search query or sponsorship associated with one or more user selectable filters in the set of user selectable filters.

27. The method of claim 1, wherein the selecting of the one or more candidate applications is performed based on context received from the first user device and associated with the application search query.

28. The non-transitory computer-readable storage medium of claim 15, wherein the selecting of the one or more candidate applications is performed based on context received from the first user device and associated with the application search query.

* * * * *